(12) United States Patent
Chen et al.

(10) Patent No.: US 7,082,544 B2
(45) Date of Patent: Jul. 25, 2006

(54) COMPUTER DEVICE AND METHOD OF CONTROLLING AN OPTICAL DISK DRIVE THEREOF

(75) Inventors: Jui-Ho Chen, Taipei (TW); Ching-Piao Kuan, Taipei (TW)

(73) Assignee: Compal Electronics, Inc., Taipei (TW)

( * ) Notice: Subject to any disclaimer, the term of this patent is extended or adjusted under 35 U.S.C. 154(b) by 408 days.

(21) Appl. No.: 10/752,814

(22) Filed: Jan. 8, 2004

(65) Prior Publication Data
US 2005/0154927 A1 Jul. 14, 2005

(51) Int. Cl.
*G06F 1/32* (2006.01)

(52) U.S. Cl. ........................ 713/324; 713/320

(58) Field of Classification Search ........ 713/300–320, 713/323, 324
See application file for complete search history.

(56) References Cited

U.S. PATENT DOCUMENTS 6,378,077 B1* 4/2002 Atkinson .................... 713/324
6,502,003 B1* 12/2002 Jacobs et al. ................. 700/95
6,895,448 B1* 5/2005 Chan et al. ................... 710/14
6,954,804 B1* 10/2005 Lam et al. .................... 710/14
2002/0178390 A1* 11/2002 Lee .............................. 713/320
2004/0225901 A1* 11/2004 Bear et al. ................... 713/300

* cited by examiner

*Primary Examiner*—Dennis M. Butler
(74) *Attorney, Agent, or Firm*—Bacon & Thomas

(57) ABSTRACT

A computer device includes a power managing controller coupled to a system controller, which in turn is coupled to an optical disk drive via an IDE bus, and operable in a normal mode, where electric power is supplied to the system controller, and a suspend mode, where electric power to the system controller is disrupted. A control key set is coupled to a keyboard controller that is coupled to the system controller and the power managing controller, and that is further coupled to the optical disk drive via a serial bus. The keyboard controller generates a control signal in accordance with operation of the control key set and received directly by the optical disk drive via the serial bus when the power managing controller operates in the suspend mode for controlling operation of the optical disk drive.

10 Claims, 2 Drawing Sheets

COMPUTER DEVICE AND METHOD OF CONTROLLING AN OPTICAL DISK DRIVE THEREOF

BACKGROUND OF THE INVENTION

1. Field of the Invention

The invention relates to a computer device and a method of controlling an optical disk drive of the computer device.

2. Description of the Related Art

At present, a computer device is usually equipped with an optical disk drive for reading optical storage media. The optical disk drive in the computer device also provides a function for playback of a musicoptical disc loaded therein.

In order to effectively reduce power consumption of the above computer device when used to play music, a conventional computer device 200, as shown in FIG. 1, has been proposed. The conventional computer device 200 includes a processor 21, a system controller 22, a power managing controller 23, an optical disk drive 24, an optical disk drive controller 25, a keyboard controller 26, a hard disk 27, and a keyboard unit 29.

The system controller 22 is coupled to the optical disk drive 24 via a multiplexer 28 and an IDE bus 30. The IDE bus 30 is further coupled to the hard disk 27.

The processor 21 is coupled to the system controller 22.

The power managing controller 23 is coupled to the processor 21, the system controller 22 and the hard disk 277 via a first switch (S1), which interconnects electrically the processor 21 and a power supply 20, a second switch (S2), which interconnects electrically the system controller 22 and the power supply 20, and a third switch (S3), which interconnects electrically the hard disk 27 and the power supply 20, respectively, and is further coupled to the power supply 20. The power managing controller 23 is operable in a normal mode, where the first, second and third switches (S1, S2, S3) are turned on by the power managing controller 23 such that electric power from the power supply 20 is supplied to the processor 21, the system controller 22 and the hard disk 27, and a suspend mode, where the first, second and third switches (S1, S2, S3) are turned off by the power managing controller 23, such as when the system controller 22 is idle, so that electric power from the power supply 20 to the processor 21, the system controller 22 and the hard disk 27 is disrupted.

The keyboard controller 26 is coupled to the system controller 22, the power managing controller 23 and the power supply 20.

The keyboard unit 29 is coupled to the keyboard controller 26.

The optical disk drive controller 25 interconnects electrically the keyboard controller 26 and the multiplexer 28, and is coupled to the power supply 20.

In actual operation, the keyboard controller 26 generates an interrupt request in accordance with operation of the keyboard unit 29 and received by the processor 21 through the system controller 2 when the power managing controller 23 operates in the normal mode so as to enable the processor 21 to generate an ATAPI control signal corresponding to the interrupt request and received by the optical disk drive 24 through the system controller 22, the multiplexer 28 and the IDE bus 30 for controlling operation of the optical disk drive 24 in accordance with the interrupt request.

On the other hand, the keyboard controller 26 generates a control request in accordance with operation of the keyboard unit 29 and received by the optical disk drive controller 25 when the power managing controller 23 operates in the suspend mode so as to enable the optical disk drive controller 25 to generate an ATAPI control signal corresponding to the control request and received by the optical disk drive 24 through the multiplexer 28 and the IDE bus 30 for controlling operation of the optical disk drive 24 in accordance with the control request.

In the above configuration, the multiplexer 28 and the optical disk drive controller 25 are needed, thereby resulting in increased costs.

SUMMARY OF THE INVENTION

Therefore, the object of the present invention is to provide a computer device and a method of controlling an optical disk drive thereof that can be implemented at a relatively low cost.

According to one aspect of the present invention, there is provided a method of controlling operation of an optical diskdrive in a computer device. The computer device includes a system controller coupled to the optical disk drive via an IDE bus, a processor coupled to the system controller, a power managing controller coupled to the processor and the system controller and operable in a normal mode, where electric power is supplied to the processor and the system controller, and a suspend mode, where electric power to at least one of the processor and the system controller is disrupted, a keyboard controller coupled to the system controller and the power managing controller and further coupled to the optical disk drive via a serial bus, and a control key set coupled to the keyboard controller.

The method comprises:

when the power managing controller operates in the suspend mode, enabling the keyboard controller to generate a control signal in accordance with operation of the control key set and received directly by the optical disk drive via the serial bus for controlling operation of the optical disk drive.

According to another aspect of the present invention, a computer device comprises:

an optical disk drive;

a system controller coupled to the optical disk drive via an IDE bus;

a processor coupled to the system controller;

a power managing controller coupled to the processor and the system controller and operable in a normal mode, where electric power is supplied to the processor and the system controller, and a suspend mode, where electric power to at least one of the processor and the system controller is disrupted;

a keyboard controller coupled to the system controller and the power managing controller and further coupled to the optical disk drive via a serial bus; and a control key set coupled to the keyboard controller;

the keyboard controller generating a control signal in accordance with operation of the control key set and received directly by the optical disk drive via the serial bus when the power managing controller operates in the suspend mode for controlling operation of the optical disk drive.

According to a further aspect of the present invention, there is provided a method of controlling operation of an optical diskdrive in a computer device. The computer device includes a system controller coupled to the optical disk drive, a processor coupled to the system controller, a power managing controller coupled to the processor and the system controller and operable in a normal mode, where electric power is supplied to the processor and the system controller, and a suspend mode, where electric power to at least one of the processor and the system controller is disrupted, a keyboard controller coupled to the system controller, the power managing controller and the optical disk drive, a keyboard unit coupled to the keyboard controller, and a control key set coupled to the keyboard controller.

The method comprises:

when the power managing controller operates in the normal mode, enabling the keyboard controller to generate an interrupt request in accordance with operation of the keyboard unit and received by the processor through the system controller so as to enable the processor to generate a control signal corresponding to the interrupt request and received by the optical disk drive through the system controller and a first bus in order to control operation of the optical disk drive in accordance with the interrupt request; and when the power managing controller operates in the suspend mode, enabling the keyboard controller to generate a control signal in accordance with operation of the control key set and received directly by the optical disk drive via a second bus so as to control operation of the optical disk drive.

According to still another aspect of the present invention, a computer device comprises:

an optical disk drive;

a system controller coupled to the optical disk drive via a first bus;

a processor coupled to the system controller;

a power managing controller coupled to the processor and the system controller and operable in a normal mode, where electric power is supplied to the processor and the system controller, and a suspend mode, where electric power to at least one of the processor and the system controller is disrupted;

a keyboard controller coupled to the system controller and the power managing controller and further coupled to the optical disk drive via a second bus;

a keyboard unit coupled to the keyboard controller; and a control key set coupled to the keyboard controller;

the keyboard controller generating an interrupt request in accordance with operation of the keyboard unit and received by the processor through the system controller when the power managing controller operates in the normal mode so as to enable the processor to generate a control signal corresponding to the interrupt request and received by the optical disk drive through the system controller and the first bus for controlling operation of the optical disk drive in accordance with the interrupt request;

the keyboard controller generating a control signal in accordance with operation of the control key set and received directly by the optical disk drive via the second bus when the power managing controller operates in the suspend mode for controlling operation of the optical disk drive.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
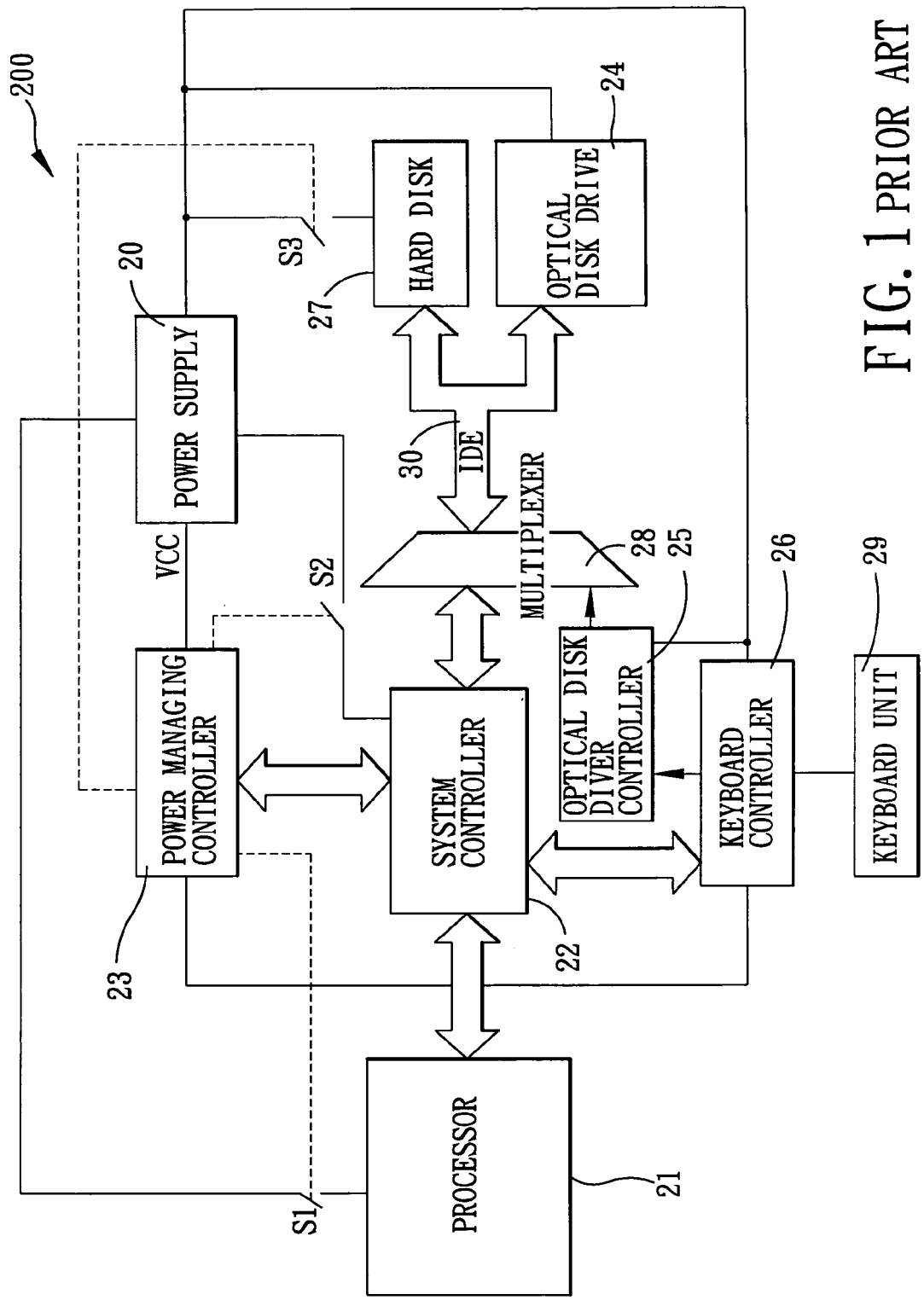
FIG. 1 is a schematic circuit block diagram of a conventional computer device.
Figure 2:
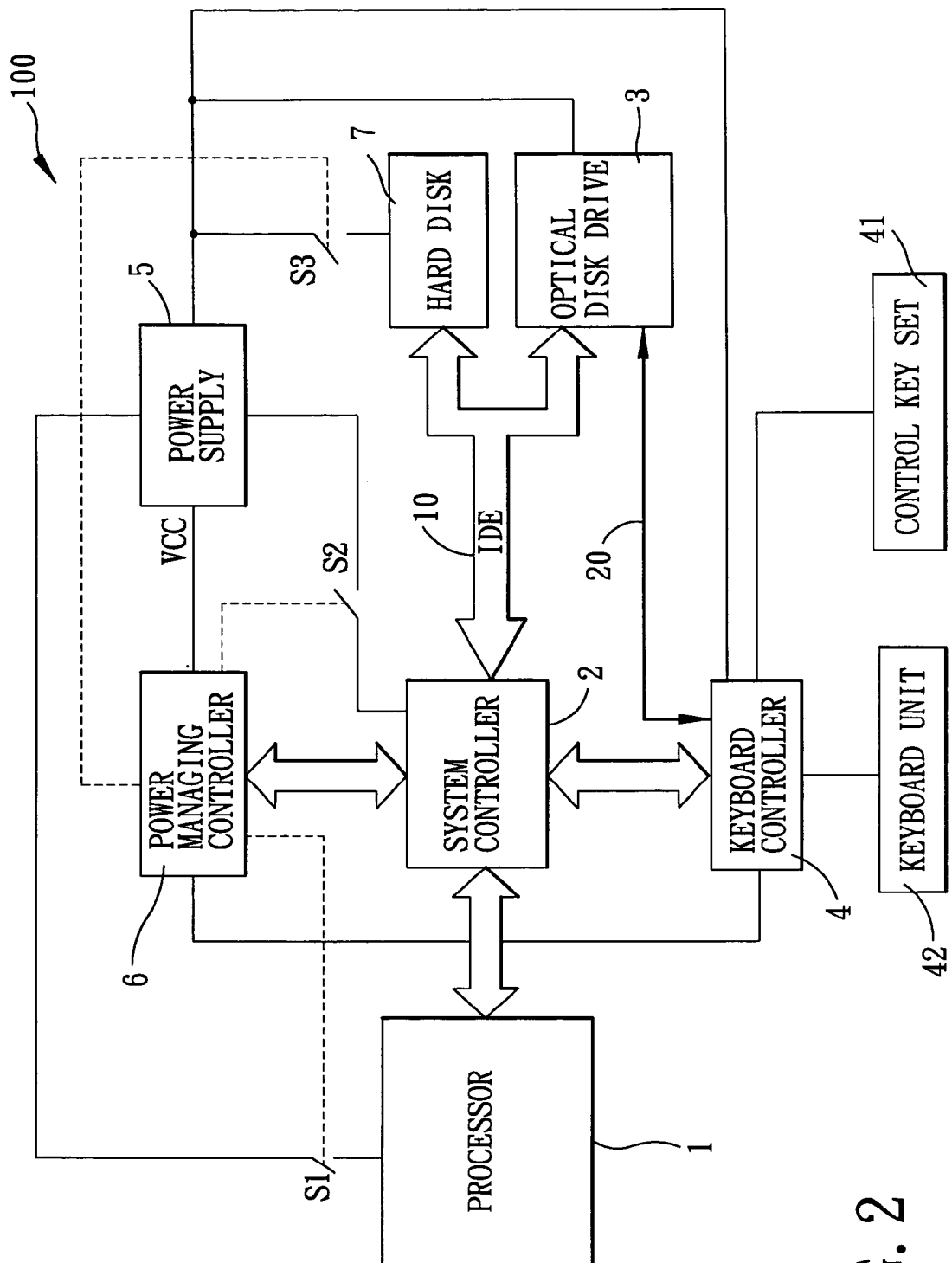
FIG. 2 is a schematic circuit block diagram illustrating the preferred embodiment of a computer device according to the present invention.

Referring to FIG. 2, the preferred embodiment of a computer device 100, such as a notebook computer, according to the present invention is shown to include an optical disk drive 3, a system controller 2, a processor 1, a power managing controller 6, a keyboard controller 4, a keyboard unit 42, and a control key set 41.

In this embodiment, the optical disk drive 3 can be one of a CD player, a CD-RW, a DVD player and a DVD-RW.

The system controller 2, such as a south-bridge chip set, is coupled to the optical disk drive 3 via a first bus 10. In this embodiment, the first bus 10 is an IDE bus, which is further coupled to a hard disk 7.

The processor 1, such as a central processing unit, is coupled to the system controller 2.

The power managing controller 6 is coupled to the processor 1, the system controller 2 and the hard disk 7 via a first switch (S1), which interconnects electrically the processor 1 and a power supply 5, a second switch (S2), which interconnects electrically the system controller 2 and the power supply 5, and a third switch (S3), which interconnects electrically the hard disk 7 and the power supply 5, respectively, and is further coupled to the power supply 5. The power managing controller 6 is operable in a normal mode, where the first, second and third switches (S1, S2, S3) are turned on by the power managing controller 6 such that electric power from the power supply 5 is supplied to the processor 1, the system controller 2 and the hard disk 7, and a suspend mode, where the first, second and third switches (S1, S2, S3) are turned off by the power managing controller 6, such as when the system controller 2 is idle, so that electric power from the power supply 5 to the processor 1, the system controller 2 and the hard disk 7 is disrupted.

The keyboard controller 4 is coupled to the system controller 2, the power managing controller 6 and the power supply 5, and is further coupled to the optical disk drive 3 via a second bus 20. In this embodiment, the second bus 20 is one of an RS232 asynchronous serial bus and an I2C synchronous serial bus.

The keyboard unit 42 is coupled to the keyboard controller 4.

The control key set 41 is coupled to the keyboard controller 4.

In actual operation, the keyboard controller 4 generates an interrupt request in accordance with operation of the keyboard unit 42 and received by the processor 1 through the system controller 2 when the power managing controller 6 operates in the normal mode so as to enable the processor 1 to generate a control signal corresponding to the interrupt request and received by the optical disk drive 3 through the system controller 2 and the first bus 10 for controlling operation of the optical disk drive 3 in accordance with the interrupt request. In this case, the control signal is an ATAPI control signal, which is transmitted in a packet format to the optical disk drive 3 via the first (IDE) bus 10.

On the other hand, the keyboard controller 4 generates a control signal in accordance with operation of the control key set 41 and received directly by the optical disk drive 3 via the second bus 20 when the power managing controller 6 operates in the suspend mode for controlling operation of the optical disk drive 3. In this case, the control signal is an ATAPI control signal, which is transmitted in a serial format to the optical disk drive 3 via the second bus 20. As such, the firmware of the optical disk drive 3 must be configured to perform operations associated with said control signal.

In addition, the keyboard controller 4 is operable in a known manner for restoring operation of the power managing controller 6 from the suspend mode back to the normal mode upon operation of the keyboard unit 42.

To sum up, due to the configuration using the second (serial) bus 20 and the control key set 41 instead of the multiplexer and the optical disk drive controller implemented in the above mentioned conventional computer device, operation of the optical disk drive 3 while the power managing controller 6 is in the suspend mode is possible without incurring large expense.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method of controlling operation of an optical disk drive in a computer device, the computer device including
   a system controller coupled to the optical disk drive via an IDE bus,
   a processor coupled to the system controller,
   a power managing controller coupled to the processor and the system controller and operable in a normal mode, where electric power is supplied to the processor and the system controller, and a suspend mode, where electric power to at least one of the processor and the system controller is disrupted,
   a keyboard controller coupled to the system controller and the power managing controller and further coupled to the optical disk drive via a serial bus, and
   a control key set coupled to the keyboard controller,
   said method comprising:
   when the power managing controller operates in the suspend mode, enabling the keyboard controller to generate a control signal in accordance with operation of the control key set and received directly by the optical disk drive via the serial bus for controlling operation of the optical disk drive.

2. A computer device comprising:
   an optical disk drive;
   a system controller coupled to said optical disk drive via an IDE bus;
   a processor coupled to said system controller;
   a power managing controller coupled to said processor and said system controller and operable in a normal mode, where electric power is supplied to said processor and said system controller, and a suspend mode, where electric power to at least one of said processor and said system controller is disrupted;
   a keyboard controller coupled to said system controller and said power managing controller and further coupled to said optical disk drive via a serial bus; and
   a control key set coupled to said keyboard controller;
   said keyboard controller generating a control signal in accordance with operation of said control key set and received directly by said optical disk drive via said serial bus when said power managing controller operates in the suspend mode for controlling operation of said optical disk drive.

3. The computer device as claimed in claim 2, wherein said serial bus is an RS232 asynchronous serial bus.

4. The computer device as claimed in claim 2, wherein said serial bus is an I2C synchronous serial bus.

5. A method of controlling operation of an optical disk drive in a computer device, the computer device including
   a system controller coupled to the optical disk drive,
   a processor coupled to the system controller,
   a power managing controller coupled to the processor and the system controller and operable in a normal mode, where electric power is supplied to the processor and the system controller, and a suspend mode, where electric power to at least one of the processor and the system controller is disrupted,
   a keyboard controller coupled to the system controller, the power managing controller and the optical disk drive,
   a keyboard unit coupled to the keyboard controller, and
   a control key set coupled to the keyboard controller,
   said method comprising:
   when the power managing controller operates in the normal mode, enabling the keyboard controller to generate an interrupt request in accordance with operation of the keyboard unit and received by the processor through the system controller so as to enable the processor to generate a control signal corresponding to the interrupt request and received by the optical disk drive through the system controller and a first bus in order to control operation of the optical disk drive in accordance with the interrupt request; and
   when the power managing controller operates in the suspend mode, enabling the keyboard controller to generate a control signal in accordance with operation of the control key set and received directly by the optical disk drive via a second bus so as to control operation of the optical disk drive.

6. A computer device comprising:
   an optical disk drive;
   a system controller coupled to said optical disk drive via a first bus;
   a processor coupled to said system controller;
   a power managing controller coupled to said processor and said system controller and operable in a normal mode, where electric power is supplied to said processor and said system controller, and a suspend mode, where electric power to at least one of said processor and said system controller is disrupted;
   a keyboard controller coupled to said system controller and said power managing controller and further coupled to said optical disk drive via a second bus;
   a keyboard unit coupled to said keyboard controller; and
   a control key set coupled to said keyboard controller;
   said keyboard controller generating an interrupt request in accordance with operation of said keyboard unit and received by said processor through said system controller when said power managing controller operates in the normal mode so as to enable said processor to generate a control signal corresponding to the interrupt request and received by said optical disk drive through said system controller and said first bus for controlling operation of said optical disk drive in accordance with the interrupt request;
   said keyboard controller generating a control signal in accordance with operation of said control key set and received directly by said optical disk drive via said second bus when said power managing controller operates in the suspend mode for controlling operation of said optical disk drive.

7. The computer device as claimed in claim 6, wherein said keyboard controller is operable for restoring operation of said power managing controller from the suspend mode back to the normal mode upon operation of said keyboard unit.

8. The computer device as claimed in claim 6, wherein said first bus is an IDE bus.

9. The computer device as claimed in claim 6, wherein said second bus is an RS232 asynchronous serial bus.

10. The computer device as claimed in claim 6, wherein said second bus is an I2C synchronous serial bus.

\* \* \* \* \*